United States Patent [19]

Arts et al.

[11] 4,205,239
[45] May 27, 1980

[54] RADIO SIGNAL SAFETY FACILITIES FOR CONTROLLING THE OPERATION OF A WORK FABRICATING DEVICE

[75] Inventors: Jerold F. Arts; William L. Owen, Jr.; Bernie D. Tull, Jr., all of Shreveport, La.

[73] Assignees: Western Electric Company, Incorporated, New York, N.Y.;

[21] Appl. No.: 879,325

[22] Filed: Feb. 21, 1978

[51] Int. Cl.² .............................................. G05B 9/03
[52] U.S. Cl. .................................. 307/328; 307/117; 307/119; 192/131 R
[58] Field of Search ................ 307/326, 116, 98, 328; 340/573, 686; 192/131 R, 129 A; 408/8, 12

[56] References Cited

U.S. PATENT DOCUMENTS

| | | | |
|---|---|---|---|
| 3,302,492 | 2/1967 | Weidig | 408/8 |
| 3,538,799 | 11/1970 | Orlando | 192/131 R |
| 3,588,867 | 6/1971 | Harris | 307/116 |
| 3,706,008 | 12/1972 | Kremer | 361/49 |
| 3,784,842 | 1/1974 | Kremer | 307/326 |
| 3,787,732 | 1/1974 | Larsen | 307/116 |
| 3,909,625 | 9/1975 | Golglazler | 307/116 |
| 3,953,770 | 4/1976 | Hayashu | 361/190 |
| 4,029,996 | 6/1977 | Miffitt | 307/326 |
| 4,123,630 | 10/1978 | MacIntyre | 192/131 R |

*Primary Examiner*—L. T. Hix
*Assistant Examiner*—S. D. Schreyer
*Attorney, Agent, or Firm*—R. P. Miller; R. P. Miller

[57] ABSTRACT

A two-hand safety system utilizing an operator's skin resistance is provided to control the operation of a work fabricating tool. An operator must place both hands on a pair of spaced electrodes in order to initiate operation of a radio digital signal generator which transmits a digital signal to a receiver. The receipt of the digital signal in conjunction with a predetermined positioning of a freely slidable work holder energize a circuit to control the operation of the work fabricating tool.

12 Claims, 4 Drawing Figures

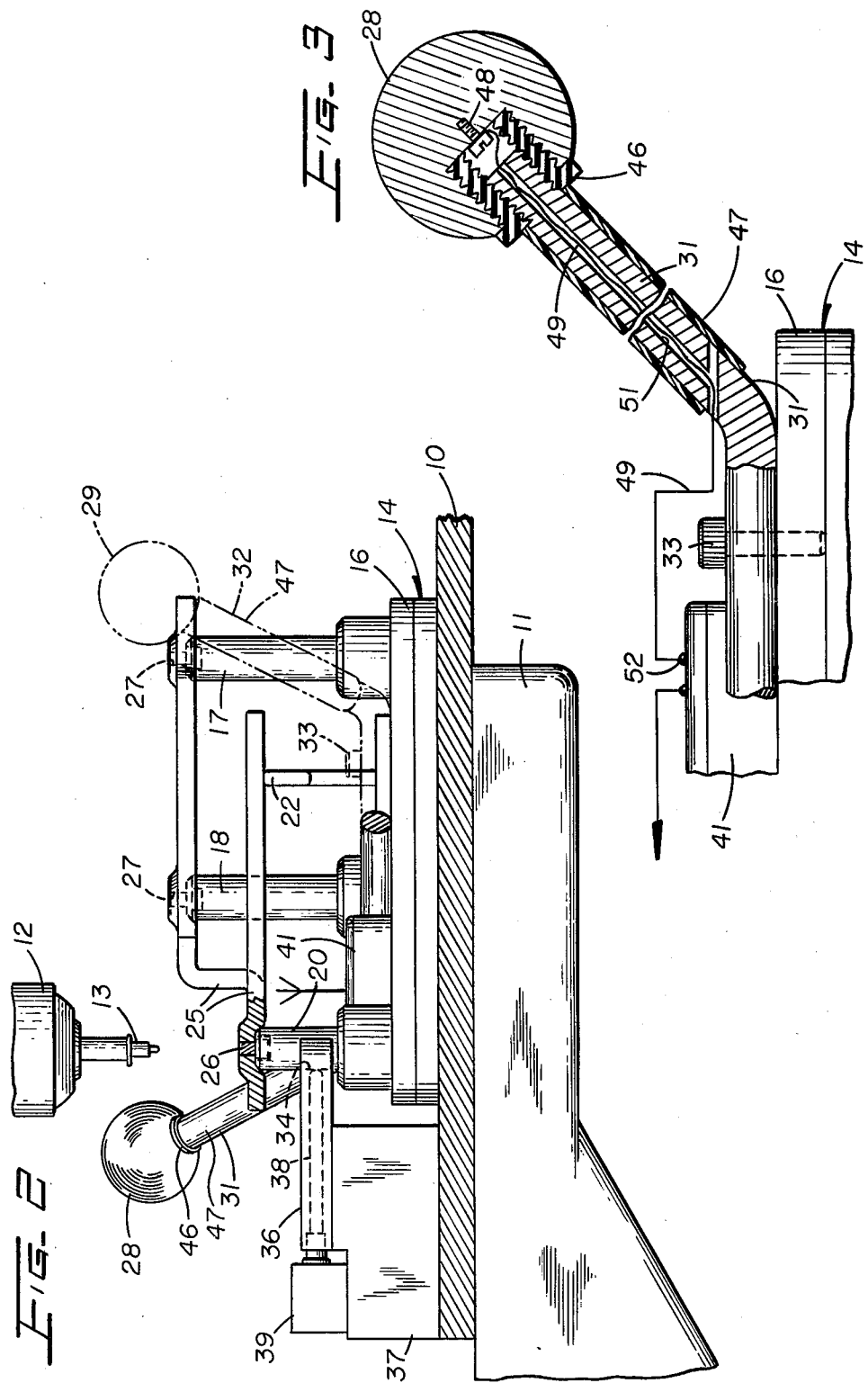

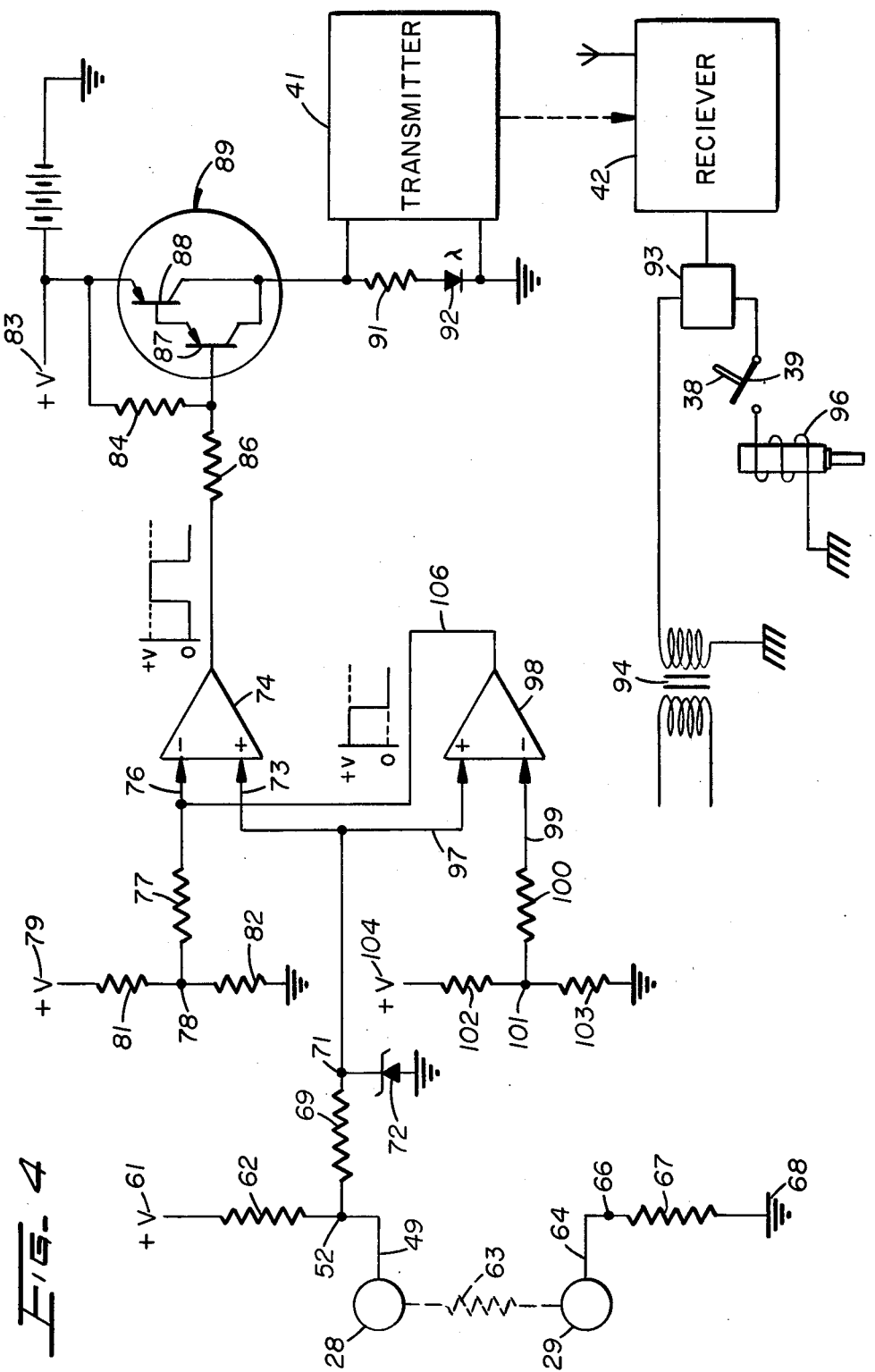

RADIO SIGNAL SAFETY FACILITIES FOR CONTROLLING THE OPERATION OF A WORK FABRICATING DEVICE

TECHNICAL FIELD OF THE INVENTION

This invention relates to safety facilities which insure that both hands of an attending operator are in safe positions during generation of a radio signal that controls the operation of a work fabricating device, and more particularly to facilities utilizing the skin resistance of an operator's body to control the generation of radio signals which in conjunction with the positioning of a work holder in a number of predetermined safe positions initiates the operation of the work fabricating device.

BACKGROUND ART

Numerous safety devices and arrangements have been developed to protect a machine operator from injury during operation of various types of work fabricating devices, such as machine tools, rivet staking punches, laser welding devices, cutters. The usual arrangements include a pair of spaced buttons which must be simultaneously depressed by the machine operator in order to actuate an interlock facility that permits the operation of the work fabricating device. These interlocks take many forms and may be electrical, mechanical, pneumatic or a combination thereof. In other situations, mechanical barriers are moved into position to prevent the positioning of the operator's hands in the path of the work fabricating device. Further, these safety facilities are usually associated with a work holder that moves along fixed guideways into and out of work fabricating position.

Considering some specific examples of the prior art, there is shown in U.S. Pat. No. 3,953,770 issued Apr. 27, 1976 to J. Hayashi, a safety arrangement wherein a high frequency electric field is formed around a machine operator standing on a wire mat having high frequency power applied thereto. A high frequency sensing antenna is positioned in the vicinity of a machine cutting tool to detect the presence of any part of the operator's body by sensing the presence of the electric field, which sensing is accompanied by the generation of a signal that functions to operate a switch to interrupt the cycling of the machine.

Other art that may be of interest with respect to the present invention includes U.S. Pat. No. 3,787,732 issued Jan. 22, 1974 to W. A. Larson, which patent discloses an electric switch comprising a pair of spaced electrodes that may be bridged by an operator's finger to control the operation of an output electronic switch. More particularly, the bridging of the spaced electrodes by the operator's finger connects the skin resistance of the finger into an input circuit to change the impedance of this circuit to initiate operation of a pair of tandem connected amplifiers to produce a switched output.

In U.S. Pat. No. 3,908,625 to Colglazier et al. dated Sept. 30, 1975, there is illustrated a touch actuated electronic switch having a pair of spaced electrodes for controlling the operation of a differential sensor and an amplifying circuit to produce a switched output. This switch circuit depends for its operation upon an operator touching either one of the two electrodes to include the capacitance of the operator's body in the input circuit for the differential sensor, which inclusion results in a change in input impedance that causes an amplifying circuit to produce the desired switched output.

There is still a need for a safety device that permits a machine operator to freely advance a slide-like work holder on a work table into a number of work positions relative to a machine tool while at the same time insuring that the machine operator's hands are not in position to be struck by a moving machine tool as it fabricates a workpiece.

A problem in providing safety facilities also exists where it is desired to perform a number of work operations on a workpiece which has a number of different elevations upon which work operations are to be performed.

SUMMARY OF THE INVENTION

The present invention contemplates, among other things, a safety circuit having a pair of spaced electrodes which must be grasped by both hands of an attending operator before a control circuit can be energized to initiate operation of a tool which performs work operations on a workpiece mounted on a freely slidable work holder.

In one particular embodiment of the invention, a work holder is provided with a pair of angularly projecting electrodes which are insulated from the work holder but are electrically connected to a control circuit for a digital radio transmitter. The control circuit includes voltage comparators for insuring the selective operation of the transmitter only upon the placement of both hands of the operator on the spaced electrodes. Upon proper positioning of the hands, the radio transmitter is rendered effective to generate a series of digital signals which energize a receiver mounted on the base for the machine tool. The receipt of the digital signals conditions a further control circuit that is subsequently operated by the closure of a sensing switch which occurs upon positioning the work holder to locate a desired portion of the workpiece in position to be acted upon by the tool. A further safety feature is incorporated in the facilities by uniquely configuring portions of the work holder so that the configured portion must be positioned with a complementary configured portion of a seat for the sensing switch. In summary, both hands of the operator must be on the spaced electrodes and a configured portion of the work holder must be moved into the configured seat before the machine tool is operated.

BRIEF DESCRIPTION OF THE DRAWINGS

Other features and advantages of the present invention will be apparent upon consideration of the detailed specification and the drawings, wherein

FIG. 2 is a side elevational view, partially in section, of the work holder in position to activate a sensing switch that initiates a staking operation on a workpiece that is to be staked at two elevations;

FIG. 3 is a side elevational view, partially in section, of one of two work positioning electrodes that must be grasped by an operator before a staking operation can take place, and FIG. 4 is a schematic circuit diagram of a comparator control circuit which is operated by an operator grasping simultaneously the pair of electrodes to control a digital radio signalling device to transmit a signal to condition the staking machine for operation.

DETAILED DESCRIPTION

Figure 1:
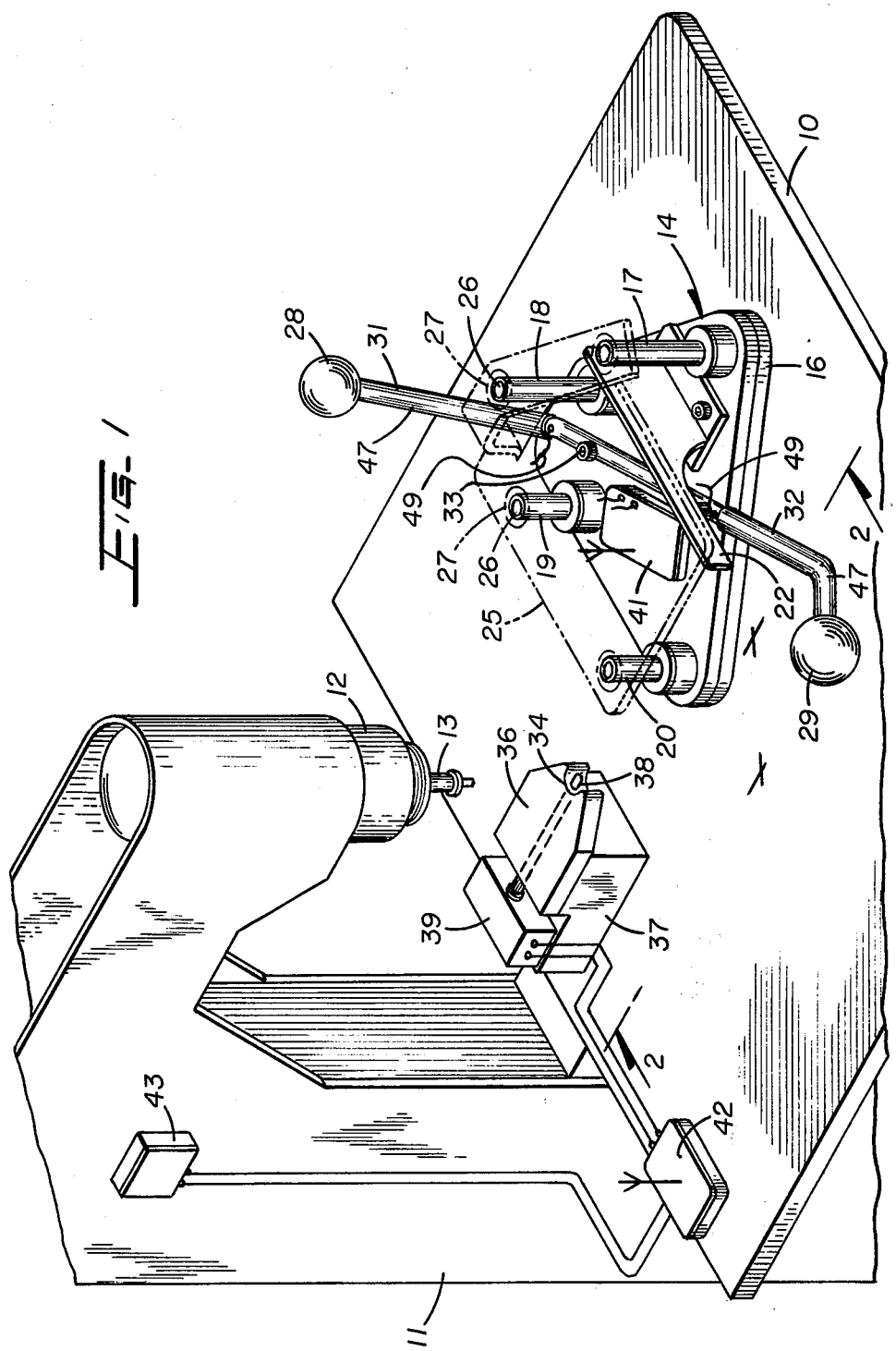
FIG. 1 is a schematic, perspective view of a work holder and a rivet staking machine together with a radio signal controlled safety facility embodying the principles of the present invention.

Referring to FIG. 1, there is shown a work support table 10 mounted on a base frame or housing 11 which also supports a fluid cylinder 12 for moving a staking punch 13 to perform a riveting operation. The present invention is concerned with protecting an attending operator from injury by utilization of the staking punch 13. It is to be understood that the present invention has utility with respect to the operation of other than staking punches, and may be readily adapted for use with other work fabricating devices, such as drills, screw insertors, electrical and laser welding tools and any other type of work fabricating device that could move a tool into position to injure an attending operator.

In the embodiment shown, a work holder 14 is slidably mounted on the support table 10. The work holder 14 comprises a flat face plate 16, see also FIG. 2, supporting round pedestals 17, 18, 19 and 20, the first two of which are longer than the second. In addition, the base plate 16 has mounted thereon a bracket 22 which in conjunction with the pedestals supports a workpiece 25 having two sections at different elevations. The section 25 of the workpiece 25 at the lower elevation is supported by the pedestals 19 and 20 and the bracket 22, while the higher elevation section of the workpiece is supported by pedestals 17 and 18. The pedestals 17, 18, 19 and 20 are counterbored to provide recesses to receive rivets 26 which extend through holes 27 formed in the workpiece.

The work holder 14 is slid along the surface of the support table 10 by an attending operator grasping and pushing a pair of brass knobs or electrodes 28 and 29 which are secured to rod-like members 31 and 32 extending angularly from the base plate 16 and secured thereto by fasteners 33. In performing a staking operation, the attending operator will grasp the knobs 28 and 29 and slide the work holder to position a pedestal, such as pedestal 20, within an arcuate seat 34 formed in a plate 36 mounted on a block 37 secured to the support table 10. It should be noted that the seat 34 and the pedestals 17, 18, 19 and 20 are configured to complement each other. Extending into the seat 34 is a sensing plunger 38 for operating a switch or first circuit maker 39 which is included as a first control element in a control circuit for operating the staking punch 13.

When the operator grasps both the knobs 28 and 29, an electrical control circuit is energized to activate a radio transmitter 41 to generate a series of distinct digital signals. The radio transmitter 41 may be of a number of commercially available types, such as sold by Sears Roebuck and Co., Alliance Manufacturing Co., for use in operating overhead garage doors. The signals transmitted by the radio 41 are picked up by a receiver 42 mounted on the housing 11. Whenever the attending operator grasps both the electrodes 28 and 29 to initiate the generation of the digital signal so that the receiver 42 is operated and the work holder 14 is slid to position a pedestal, e.g., 20, in the seat 34 to operate the switch 39, a circuit is completed to operate a controller 43, such as a solenoid valve, to admit fluid to the cylinder 12 to move the staking punch 13 into position to stake a rivet 26 to the workpiece 25.

Referring now to FIG. 3 for a detailed consideration of one of the knobs and the angularly extending rods, the knob, such as 28, may be constructed of brass or other conductive material and has a tapped hole formed therein to receive a hollow plug 46 constructed of electrical insulating material and having formed therein external and internal threads. A rod, such as rod 31, has a threaded end that is received within the threaded plug 46. The rod 31 is provided with a coating 47 of insulative plastic material. Threaded into the bottom of the tapped hole formed in knob 28 is a conductive screw 48 for securing a conductive wire 49 to the knob. This wire which has insulation thereon extends through a passage 51 formed in the rod 31 and is connected at its other end to a terminal junction 52 of a voltage comparator control circuit for controlling the operation of the radio transmitter 41.

Considering now the schematic circuit shown in FIG. 4, there is shown the two knobs or electrodes 28 and 29 connected in a first voltage divider circuit comprising a voltage source 61, a high value resistance 62, the junction 52, the wire 49, the knob or electrode 28, a resistance 63 representative of the skin resistance of the attending operator, the electrode 29, a wire 64, a terminal junction 66 and a resistor 67 running to ground 68. The voltage source 61 may be of a relatively low value, such as supplied by a 9 volt battery. Resistance 62 is selected to be of a relatively high value, such as 150K ohms while the resistance 67 is of a lower value, for example, 15K ohms. With the selection of these voltages and resistance values, the current flow through the resistance 63 provided by the operator's body is extremely low and will not even be sensed by the operator. Connected to the junction 52 is a current limiting resistor 69 which is connected through a junction 71 and a Zener diode 72 to ground. This circuit arrangement provides static or high voltage protection for the elements in the control circuit.

In the situation where the operator is not touching the electrodes 28 and 29, a first biasing voltage is impressed from source 61 to a first input 73 of a voltage comparator 74. A second input 76 of the voltage comparator 74 is connected through a current limiting resistor 77 to a junction 78 of a voltage divider comprising a battery voltage source 79, resistor 81 and resistor 82 connected to ground. The second biasing voltage applied at input 76 from junction 78 is low in comparison to the biasing voltage applied at input 73 from junction 52 and, hence, the voltage comparator 74 is held from operation. A voltage source 83 is connected through resistors 84 and 86 to the output of the voltage comparator 74, and is also connected through the resistor 84 to a base input of a transistor 87 which in conjunction with a transistor 88 form a Darlington pair 89. The Darlington pair is held from operation by the relatively high voltage applied from source 83 and is, thus, not effective to produce an output which would initiate operation of the radio transmitter 41.

Connected across the input of the radio transmitter 41 is a resistor 91 and a light emitting diode 92. When the Darlington pair 89 is rendered conductive to initiate operation of the transmitter 41, the light emitting diode 92 will be illuminated to apprise the operator that the transmitter is sending signals to condition the staking punch for operation.

In the situation where the operator places both hands on the respective electrodes 28 and 29, the operator's body or skin resistance 63 is connected into the voltage divider circuit so as to effectuate a drop in potential at junction point 52 which is impressed on the first input 73 to the voltage comparator 74. This input is below the voltage value applied from junction 78 to input 76 and, thus, the voltage comparator 74 is rendered conductive resulting in a drop in potential being impressed on the base input 87 of the Darlington pair 89. The Darlington pair 89 commences conduction to initiate operation of the transmitter 41 which sends out a pulse coded or digital signal to the receiver 42.

The receipt of the signal by the receiver 42 effectuates operation of an electronic switch or second circuit maker 93 which is included as a second control element in the control circuit for operating the staking punch. When a pedestal, such as pedestal 20, is positioned within seat 34 to actuate sensing pin 38 and close a contact of switch 39, an energizing circuit is completed from an A.C. source represented by a transformer 94, the now closed electronic switch 93, the contact of switch 39 and the windings of a solenoid 96. Solenoid 96, when energized, operates a valve included in controller 43 to apply fluid to cylinder 12 to move the staking punch 13 to stake a rivet 26 to the workpiece 25.

In the situation where the operator attempts to short out the electrodes 28 and 29 by placing a conductor, such as a conductive strap between the electrodes, there will be a significant voltage drop at junction 52 which is immediately impressed on a first input 97 of a second voltage comparator 98. A biasing control voltage for the comparator 98 is set by a second input 99 being connected through a current limiting resistor 100 to a junction point 101 of a voltage divider comprising resistors 102 and 103 and a voltage source 104 which may be the same voltage source as designated by the reference numeral 61. The reduced voltage impressed from junction 52 is less than the voltage applied from junction 101 to the other input 99 of the voltage comparator 98 and, hence, the voltage comparator is rendered conductive to impress a drop in potential over a lead 106 to the second input 76 of the voltage comparator 74 to drop and hold this voltage below the level of the voltage applied to the first input 73 and, thus, preclude the operation of this comparator. It will be recalled that when the voltage comparator 74 is not conducting, the Darlington pair 89 is held from operation and the transmitter 41 is precluded from transmitting the distinct digital signals which would enable the operation of the staking punch 13.

Briefly, in summary, the operator places rivets in the recesses formed in the pedestals and loads the workpiece 25 on the pedestals with the rivets extending through the holes 27 and then grasps in each hand one of the spaced electrode knobs 28 and 29 to initiate the transmission of the distinct digital radio signals. The operator freely slides the work holder on the table top 10 to position a pedestal 17, 18, 19 or 20 in the recessed seat 24 to actuate the sensing pin 38 and the contact of the switch 39. Receipt of the digital signal by the receiver 42 and the closure of the switch 39 results in the completion of an energizing circuit for the solenoid controller 43 which then functions to control the actuation of the staking tool 13. The staking tool is of a commercial type which is pressure sensitive, that is, it will move down into staking position and will remain there until a predetermined pressure is built up in the cylinder 12 whereupon the tool 13 is automatically retracted. This feature permits the attending operator to safely perform a succession of staking operation on rivets which are positioned in different elevations of the workpiece.

What is claimed is:

1. A safety system for controlling a work fabricating device, which comprises:
   a radio transmitter for transmitting a predetermined signal;
   a work holder;
   means for supporting the work holder for movement to and from the work fabricating device;
   a pair of spaced electrodes mounted on said work holder, said spacing of said electrodes being sufficient to insure that an operator must individually grasp an electrode in each hand;
   circuit means including said electrodes connected to said radio transmitter and rendered effective by the operator grasping said electrodes to initiate a consequent flow of current through the body of the operator and between the electrodes for operating said radio transmitter to transmit said predetermined signal; and
   means responsive to the receipt of said predetermined signal for controlling the operation of the work fabricating device.

2. A safety system as defined in claim 1, wherein said circuit means includes:
   a first voltage comparator;
   a first biasing means for holding said voltage comparator from operation; and
   a second biasing means including said pair of electrodes for operating said voltage comparator when the operator grasps both of said electrodes.

3. A safety system as defined in claim 2, wherein said circuit means includes;
   a second voltage comparator;
   a biasing control means for holding said second voltage comparator from operation;
   means responsive to the placement between said electrodes of a conductor having a resistance less than the body resistance of the operator for operating said second voltage comparator; and
   means for applying the output of said second voltage comparator to hold said first voltage comparator from operation.

4. A safety system as defined in claim 1, wherein said signal responsive means includes:
   a first non-operated circuit maker;
   a radio signal receiver for operating said first circuit maker;
   a second non-operated circuit maker;
   means responsive to the operator placing a workpiece in position to be worked upon by the work fabricating device for operating said second circuit maker; and
   means responsive to the operation of said first and second circuit makers for operating the work fabricating device.

5. A safety facility for insuring that an attending operator's hands are not in position to be injured during the operation of a work fabricating device, which comprises:
   a control means including first and second normally unoperated elements for actuating the work fabricating device;
   a pair of spaced electrodes;
   means responsive to the skin resistance of the attending operator grasping one of the pair of electrodes in each hand to initiate a consequent flow of current through the operator's body for generating a radio signal;

means responsive to said radio signal for operating the first of said elements; and means responsive to the positioning of a workpiece in position to be worked upon by the work fabricating device for operating the second of said elements to actuate the work fabricating device.

6. A safety system for controlling an actuation of a tool, which comprises:

a work holder movably mounted for receiving an article to be worked on by the tool;

a pair of spaced electrodes on said work holder;

means including a pair of circuit makers for actuating the tool;

means responsive to an attending operator grasping both electrodes to initiate a consequent flow of current through the operator's body and between the electrodes for generating and transmitting a predetermined signal;

means responsive to receipt of said predetermined signal for operating a first of said circuit makers; and means responsive to the movement of the work holder into a position to have the tool act upon the article for operating a second of said circuit makers.

7. A safety system as defined in claim 6, wherein:

said work holder includes a configured member; and said means for operating the second of said circuit means includes means configured to complement said configured member of the said work holder for controlling the operation of said second circuit maker.

8. A safety system for controlling an actuation of a tool, which comprises:

a work holder movably mounted for supporting an article to be worked upon by the tool;

a pair of spaced electrodes on said work holder;

means including a pair of circuit makers for actuating the tool;

means responsive to an attending operator grasping both electrodes to initiate a consequent flow of current through the operator's body and between the electrodes for generating and transmitting a predetermined signal;

means responsive to the receipt of said predetermined signal for operating a first of said circuit makers; and means responsive to the operator pushing on the electrodes to move the work holder into a position to have the tool act upon the article for operating a second of said circuit makers.

9. A safety system as set forth in claim 8, wherein the work holder includes a plurality of parts of a particular configuration, and the second circuit member is positioned within a receptacle conforming in shape to the configuration of any one of said parts of said work holder.

10. A safety facility for controlling the operation of a tool, which comprises:

a work holder mounted to freely slide over a surface for positioning a workpiece to be acted upon by the tool;

a pair of spaced conductors mounted on the work holder for placing the individual hands of an attending operator to connect the operator's body resistance between said spaced conductors;

a radio transmitter means responsive to the connection of the operator's body resistance between said spaced conductors to initiate a consequent flow of current between the spaced conductors for transmitting a radio signal;

means including a pair of normally open switch means for actuating said tool to perform a work operation on the workpiece;

first means responsive to the receipt of said radio signal for completing a first of said switch means; and second means responsive to the sliding of the work holder into position to be acted upon by said tool for completing the second of said switch means and initiating actuation of said tool.

11. A safety system as defined in claim 10, wherein:

said work holder includes a portion thereof formed in a predetermined configuration; and said second switch completing means includes a seat configured to complement said configured portion of the work holder, and a sensing means operated by the positioning of said configured portion of the work holder in said configured seat for operating said second switch means.

12. A safety system for use with a movable tool, which comprises:

a work table;

a work holder positioned on the table for free sliding movement thereover;

a pair of spaced electrodes projecting from the work holder for receiving an attending operator's hands;

a radio transmitter mounted on said work holder for transmitting a predetermined control signal;

a voltage divider having said pair of spaced electrodes included in one arm thereof for producing a predetermined voltage when the attending operator's hands are placed on the electrodes to include the operator's skin resistance as a resistance between said electrodes;

a comparator circuit responsive to said predetermined voltage being over a set value for operating said radio transmitter to transmit said predetermined control signal;

means responsive to placing a resistance less than the operator's skin resistance between said electrodes for precluding operation of said comparator circuit; and means responsive to the receipt of said predetermined radio signal and the sliding of a section of work holder into position in alignment with the tool for moving said tool.

* * * * *